UNITED STATES PATENT OFFICE.

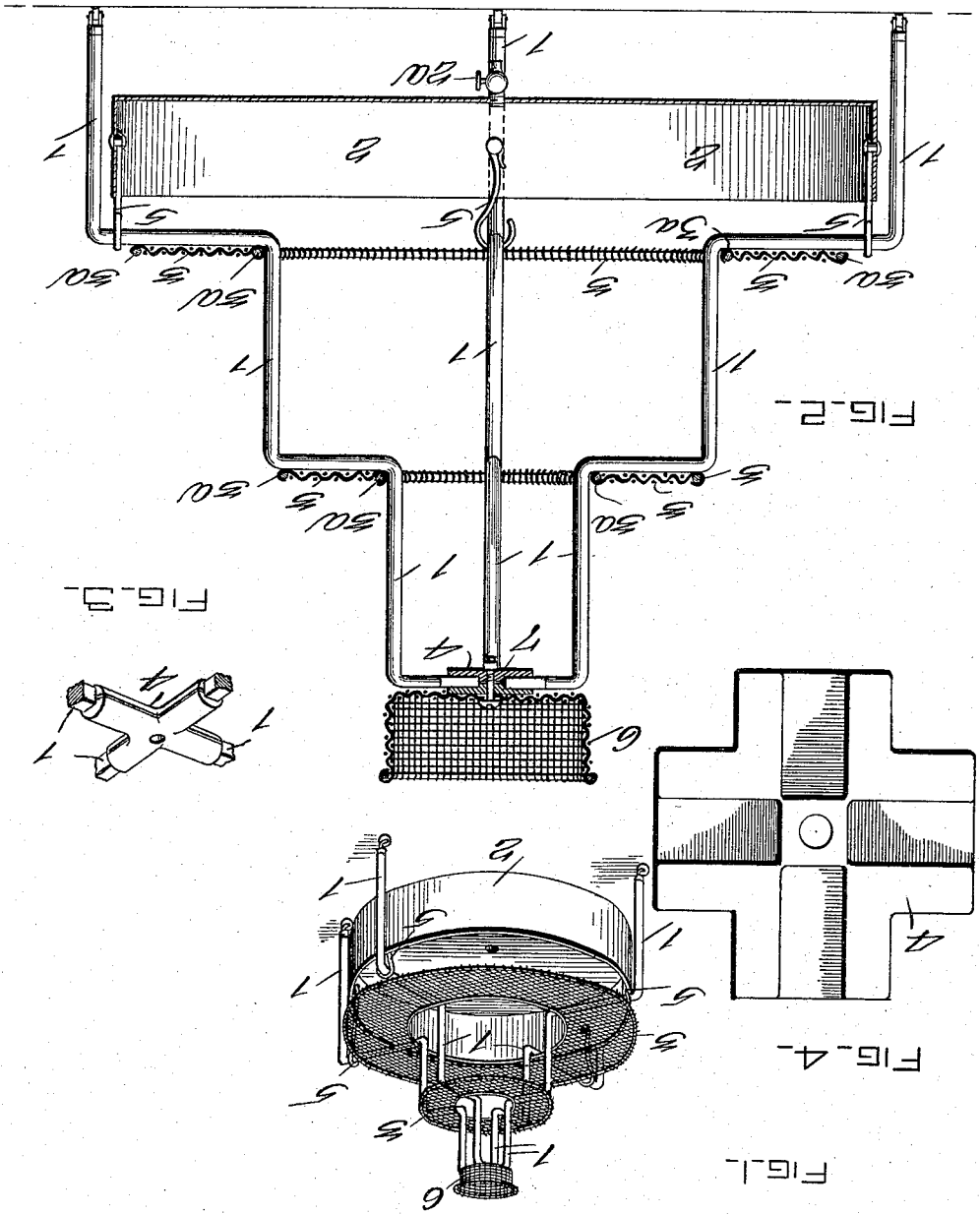

ALVIN THOS. CHALK, OF BALTIMORE, MARYLAND.

PLANT AND FLOWER STAND.

1,153,028.    Specification of Letters Patent.    Patented Sept. 7, 1915.

Application filed January 28, 1915. Serial No. 4,876.

*To all whom it may concern:*

Be it known that I, ALVIN T. CHALK, a citizen of the United States, and a resident of Baltimore, in the State of Maryland, have made an Improvement in Plant and Flower Stands, of which the following is a specification.

My invention is constructed with special reference to lightness, cheapness, durability, and adaptation for detachment or disassociation of its parts or members for the purpose of storage or transportation in compact form.

The details of construction, arrangement and operation of the device are as hereinafter described and illustrated in the accompanying drawing, in which, Figure 1 is a perspective view of the complete stand. Fig. 2 is a vertical section of the same enlarged. Fig. 3 is a perspective of the clamping head portion of the stand. Fig. 4 is a plan view of one of the duplicate parts of a slightly modified form of the clamp.

The frame is formed of a series (preferably 4) metal rods 1, which are bent to form horizontal shoulders that constitute supports for a drip-receiver 2, and woven wire shelves 3. The rods or frame members 1 thus present a series of steps and their upper squared ends are held detachable in sockets of a cruciform head or member 4. Thus, while the legs or supports 1 are adapted to be readily detached from the head 4, they form a rigid frame when connected as shown in the drawing. The said head is made in duplicate parts secured together by a screw bolt, thus constituting a clamp.

Shelves 3 are formed of woven wire whose edges are connected with two parallel wires 3ª, as illustrated in Fig. 2. By reason of the several horizontal bends of the legs or supports 1, the frame formed by them and the head member 4 is narrowed from the base upward and each of the wire shelves may be slipped on over a portion of the frame to which it appertains.

The drip-pan 2 is preferably made of galvanized sheet metal and provided centrally with a drain-cock 2ª to provide for drawing off the liquid contents of the pan when required. The pan is detachably suspended from the lower horizontal portions or shoulders of the supports 1 by means of hooks 5 which are pivoted to the sides of the pan, as shown in Fig. 2. The hooks are open at their free ends and thus adapted to be readily attached to and detached from the horizontal portions of the supports 1. The latter are provided with casters. It will be noted that the drip-pan is of greater diameter than the lower or largest shelf 3, and thus the pan is adapted to receive drip from all the shelves.

Upon the top of the stand-frame is supported a small wire basket which is detachably secured in place by means of a screw 7 which enters a socket in the head member 4. This basket is thus adapted to receive pots containing plants or flowers or cut flowers when desired.

It will be seen that the construction described enables the stand members to be easily and quickly put together, or separated from each other when it is required to pack them compactly for storage or transportation.

When the supports 1 have been detached from the head 4, they may be laid side by side in contact, and thus occupy comparatively small space. The screens 3 and the basket 6 may also be put together and laid in the drip-receiver 2.

By constructing the shelves of woven wire, they offer comparatively little obstruction to the passage of light, which is highly desirable for the purpose of effective display of the plants or flowers, and for access of light thereto. The screens also permit the free passage of water, which drips into and is retained by the receiver 2.

In practice, the stand will be made of various sizes, and it is to be understood that it may be other than circular in general form, as for instance, semi-circular or angular, as conditions may suggest.

What I claim is:—

The improved plant and flower stand comprising a skeleton frame formed of a series of vertical metal rods constructed of portions forming legs and having a series of outward bends serving as horizontal shoulders or supports, a clamp securing together the upper ends of said rods, a series of annular shelves graduated in size, a drip pan arranged beneath the lowest shelf and made of greater diameter than the latter, and means supporting it detachably from the lower shoulder of the vertical rods, as described.

ALVIN THOS. CHALK.

Witnesses:
J. ABNER SAYLER,
WILLIAM E. SCHUL.

Copies of this patent may be obtained for five cents each, by addressing the "Commissioner of Patents, Washington, D. C."